Dec. 18, 1923.
S. L. GREENE
1,477,948
VEHICLE WHEEL
Filed Aug. 5, 1922
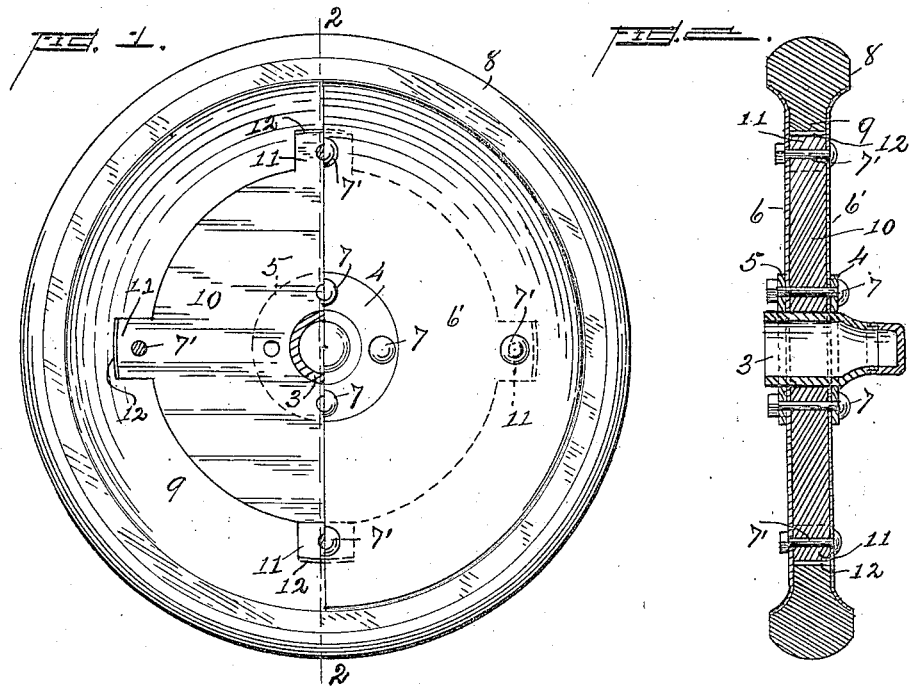
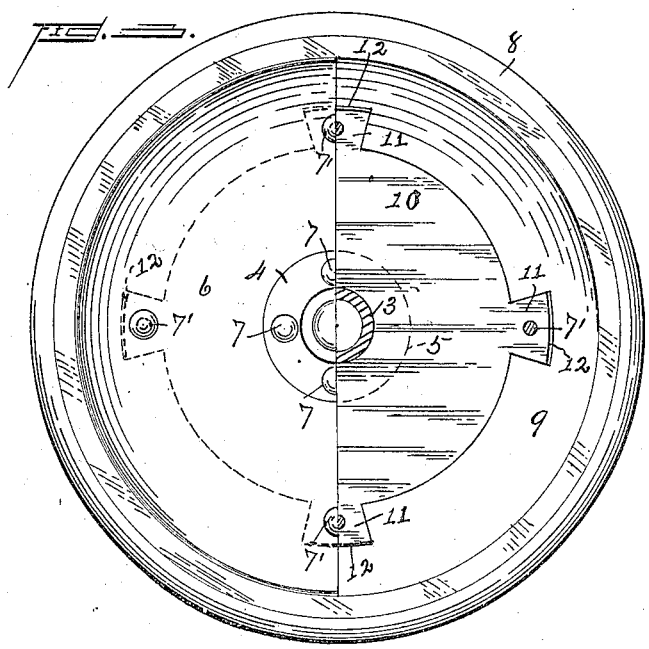
Inventor:
Samuel L. Greene.
By Albert E. Tanner
Atty.

Patented Dec. 18, 1923.

1,477,948

UNITED STATES PATENT OFFICE.

SAMUEL L. GREENE, OF WATERBURY, CONNECTICUT.

VEHICLE WHEEL.

Application filed August 5, 1922. Serial No. 579,931.

*To all whom it may concern:*

Be it known that I, SAMUEL L. GREENE, a citizen of the United States, and a resident of Waterbury, in the county of New Haven and State of Connecticut, have invented certain new and useful Improvements in Vehicle Wheels, which improvements are fully set forth in the following specification.

This invention relates to improvements in devices of that class commonly known as vehicle wheels, and more particularly to vehicle wheels of the so-called disc type.

The object of this invention is to provide a vehicle wheel which shall be simple and inexpensive as regards its construction; durable, efficient and dependable in practical service; convenient in its application to practical purposes; and which shall possess certain well-defined advantages over prior analogous constructions.

The invention consists in the combinations, parts and details to be hereinafter more fully referred to and set forth in the claims hereto appended, and whereby the attainment of the foregoing object is rendered practicable.

The invention is clearly illustrated in the accompanying drawing, wherein:

Fig. 1 is a face view of a vehicle wheel embodying my said improvements, a portion of the near clamping member being broken away to more clearly disclose certain details of the interior construction, together with the preferred form of the tire anchor made use of.

Fig. 2 is a diametric section of same, the section being taken as along the dotted line 2—2 of Fig. 1.

Fig. 3 is a view similar to Fig. 1 showing the assembled tire anchor and tire modified, each somewhat in form.

In a general sense my present invention comprises a suitable hub for the reception of the usual bearing parts and elements and a non-inflatable tire, preferably of solid rubber, the latter anchored against creeping, and clamped against casual lateral displacement, relatively to the hub.

Having reference to the accompanying drawing, wherein similar reference characters denote like parts throughout the respective views, I, in carrying out my present invention, make use of the customary hub 3 for the reception of the usual bearing parts and elements, said hub affording an annular flange 4 formed integral therewith near one extremity thereof and adapted to displaceably receive at the opposite extremity thereof a minor draw-collar 5, the function of which will more fully hereinafter appear.

6 6' denote tire-clamping members, freely pierced centrally and received opposedly by the hub 3, one of them, as 6' being thereafter arranged in fixed relation to said hub, as through the medium of a draw-bolt 7 piercing jointly the flange 4 and the clamping member last mentioned, all as will be more fully explained hereinafter.

The clamping members 6 6' are provided to clamp and hold at and between the peripheral margins thereof, and under a stress applied jointly thereto and tending to draw them together, as will be hereinafter explained, a non-inflatable tire 8, constructed solidly of rubber, by preference.

The tire 8 affords a suitable tread surface at the outer circumference thereof, speaking relatively to the axis of the completed wheel; and further affords at the inner circumference thereof a clampable reinforcing web 9, which normally lies between the clamping members 6, 6', at the peripheral margins thereof and is preferably formed integral and continuously with said tire.

In practice the web 9 is subjected at its opposite faces to a strong clamping effect through the medium of the clamping members 6, 6', when drawn snugly together, and whereby the tire 8 is enabled to effectually resist substantially all service strains encountered laterally thereby in practical operation.

While the foregoing parts assembled as stated constitute a vehicle wheel of substantial efficiency, it might occasionally happen that the traction strain encountered thereby in practice could be of an intensity sufficient to overcome to a greater or less degree the clamping effect aforenamed exerted on the web 9 by the members 6, 6' when drawn snugly together as hereinbefore stated, thereby permitting or inducing the tire 8 together with its web 9 to creep more or less freely on and between said members 6, 6', which, of course, would be quite objectionable.

To avoid the foregoing objectionable contingency I removably position on the hub 3, between the members 6, 6', a tire anchor 10, between which and the web 9 there is constantly maintained an interlocking engagement whereby creeping or turning of the tire aforenamed independently of the anchor 10, is effectually obviated, said anchor having a fixed relation to the hub 3.

For the attainment of the foregoing end I contemplate providing the anchor 10 with a suitable peripheral tooth or detent 11, the web 9 being provided, for the free reception and occupancy of which tooth or detent, with a corresponding internal indent or recess 12; and it will be quite readily understood that a greater or less series of the detents 11, and a greater or less corresponding series of the indents 12 may be provided for the anchor 10 and the web 9, respectively, as found advisable in practice and as clearly disclosed in the construction shown in Fig. 1 together with the modification thereof shown in Fig. 3, of the accompanying drawing.

In practice I contemplate that the draw-bolt 7, or each of any appropriate number thereof, shall pierce jointly the flange 4, the opposed clamping members, and the anchor 10 positioned therebetween, as clearly indicated in the drawing and whereby said parts are brought jointly into fixed relation with the hub 3, as hereinbefore referred to, said clamping members and said tire-anchor being best further drawn and locked more firmly together, for a clamping effect therebetween, through the medium of a suitable auxiliary, draw-bolt 7', or each of a suitable series thereof, piercing jointly only said clamping members and tire-anchor, all as clearly illustrated in the drawing.

When constructed as herein described, the various parts of the completed wheel may be quickly and conveniently assembled or knocked down; undue stretching of the tire in adjusting the same for service—as not rarely happens in common practice, and whereby its tendency to creep under final adjustment is markedly enhanced—is definitely avoided; and there is ensured for the tire made use of, by reason of the give-and-take character of the web 9, a desirable measure of elasticity peculiar alone to applicant's present construction.

The clamping members 6, 6' are best made, each from metal in sheet-form and in the form of an integral disc, while the tire anchor 10 may be made from any suitable material, practically non-yielding, as wood or metal.

It will be seen that my improved vehicle wheel is well adapted for the purposes for which it is intended, being strong, serviceable and inexpensive in its construction, and further that the same may be modified to a considerable extent, particularly as regards the means availed of, whereby is secured the interlocking relation between the tire 8 and the tire anchor 10, without material departure being made from the spirit and principle of my invention as set forth in and coming within the scope of the claims hereto appended.

Having thus described my invention, I claim:

1. A vehicle wheel comprising a hub; clamping members opposedly disposed on said hub and drawable thereon, one in the direction of the other for a clamping effect therebetween; a tire assembled peripherally with said clamping members and adapted to receive a clamping effect therefrom, upon the same being duly drawn together; a tire anchor disposed on said hub between the clamping members and interengaging the tire aforenamed; and means for duly drawing together the clamping members and holding the same, together with said tire anchor, jointly in fixed relation to the hub aforenamed.

2. A vehicle wheel comprising a hub; clamping members opposedly disposed on said hub and drawable thereon, one in the direction of the other for a clamping effect therebetween; a tire assembled peripherally with said clamping members and fitted with a reinforcing web affording an internal indent, said web lying between the clamping members and clampable thereby upon the same being duly drawn together; a tire anchor disposed on said hub between the clamping members and fitted with a detent normally occupying said indent; and means for duly drawing together the clamping members and holding the same, together with said tire anchor, jointly in fixed relation to the hub aforenamed.

3. A vehicle wheel comprising a hub; clamping members opposedly disposed on said hub and drawable thereon, one in the direction of the other for a clamping effect therebetween; a tire assembled peripherally with said clamping members and fitted with a reinforcing web affording a series of internal indents, said web lying between the clamping members and clampable thereby upon the same being duly drawn together; a tire anchor disposed on said hub between the clamping members and fitted peripherally with a series of detents normally occupying, respectively, said indents; and means for duly drawing together the clamping members and holding the same, together with said tire anchor, jointly in fixed relation to the hub aforenamed.

4. A vehicle wheel comprising a hub; a tire of yieldable material disposed concentrically to the hub; a tire anchor of non-yielding material on the hub in registry with and interengaging the tire; and means for displaceably locking together said hub, tire anchor and tire.

5. A vehicle wheel comprising a hub; a tire of yieldable material disposed concentrically to the hub and having an internal reinforcing web formed integral therewith; a disc-like tire anchor of non-yieldable material disposed on the hub in plane registry with the tire aforenamed and interengaging the web thereof; and means for displaceably locking together said hub, tire anchor and tire.

SAMUEL L. GREENE.